United States Patent [19]

Furuya

[11] Patent Number: 5,442,803
[45] Date of Patent: Aug. 15, 1995

[54] HALF DUPLEX COMMUNICATION SYSTEM HAVING QUICK CHANNEL ASSIGNMENTS

[75] Inventor: Yukitsuna Furuya, Tokyo, Japan

[73] Assignee: NEC Corporation, Tokyo, Japan

[21] Appl. No.: 957,900

[22] Filed: Oct. 8, 1992

[30] Foreign Application Priority Data

Oct. 8, 1991 [JP] Japan .................. 3-260623

[51] Int. Cl.⁶ ............................. H04B 7/14
[52] U.S. Cl. ................... 455/15; 455/34.1; 455/56.1
[58] Field of Search .............. 455/15, 17, 20, 33.1, 455/34.2, 34.1, 54.1, 54.2, 56.1; 370/24, 29.31

[56] References Cited

U.S. PATENT DOCUMENTS

| | | | |
|---|---|---|---|
| 3,764,915 | 10/1973 | Cox et al. | 455/34.1 |
| 4,012,597 | 3/1977 | Lynk, Jr. et al. | 455/34.1 |
| 4,905,302 | 2/1990 | Childress et al. | 455/34.1 |
| 5,086,507 | 2/1992 | Mela | 455/34.1 |
| 5,159,702 | 10/1992 | Aratake | 455/56.1 |

OTHER PUBLICATIONS

Mizukami, et al, "MCA System", NEC Technical Journal, Dec. 1982, pp. 62–65.

Primary Examiner—Edward F. Urban
Assistant Examiner—Andrew Faile
Attorney, Agent, or Firm—Foley & Lardner

[57] ABSTRACT

A half duplex radio communication system having including a plurality of terminal equipments and a base station for relaying communications between the terminal equipments is characterized by, in each of the terminal equipments, transmitting a transmission right demand signal upon initiation of transmission and a transmission end signal upon termination of transmission. The base station is responsive to the transmission right demand signal from the terminal equipment for assigning a transmission channel, and is responsive to the transmission end signal for releasing the channel assignment and for assigning the transmission channel for the terminal equipment newly obtaining the transmission right.

3 Claims, 2 Drawing Sheets

| | 1 | 2 | 3 | 1 | 2 | 3 | (TIME SLOT) |
|---|---|---|---|---|---|---|---|
| $f_1$ | BC | CC | CC | BC | CC | CC | BC |
| $f_2$ | AS | T | T | AS | T | T | AS |
| $f_3$ | T | AS | T | T | AS ($f_3$:1) | T | T |
| $f_4$ | T | T | AS ($f_3$:1) | T | T | AS | T |
| $f_5$ | T(Q) | T | T | T | T | T | T |
| (FREQ.) | | | | | | | |

BC: BROADCASTING CHANNEL
CC: CONTROL CHANNEL
AS: ASSIGNMENT CHANNEL
T: TRAFFIC CHANNEL

HALF DUPLEX COMMUNICATION SYSTEM HAVING QUICK CHANNEL ASSIGNMENTS

BACKGROUND OF THE INVENTION

The present invention relates to a half duplex radio communication system. More specifically, the invention relates to a channel assignment in a communication network for half duplex radio communication between two terminals through a base station serving as repeater station.

As a system for half duplex radio communication between terminals through the base station, a conventional MCA (Multi-Channel Access) system is well known. In a conventional MCA system, a channel assignment method is employed. A communication channel is assigned upon the initiation of communication, the base station does not manage which terminal equipment effects transmission through the assigned channel, and the terminal equipment to effect transmission is mutually determined between the terminals. After the termination of communication, the base station releases the channel assignment and assigns the corresponding channel for other communication.

Such channel assignments may effectively use of the channels since either one of the terminals uses the assigned channel as long as two communicating terminal equipments are included in the same zone. Details for such a MCA system have been disclosed in NEC Technical Journal, "MCA System", issued by Nippon Electric Company, December, 1982, pages 62~65.

Conventional channel assignment methods are, however, not effective, especially when terminals communicating with each other do not exist in the same zone. In such a situation, both a forward channel from the base station to the terminal and a backward channel from the terminal to the base station are assigned at each zone. The two channels are not used simultaneously.

SUMMARY OF THE INVENTION

Therefore, it is an object of the invention to provide a half duplex radio communication system which can realize high channel use efficiency even when communicating terminals are not included in the same service zone.

A half duplex radio communication system, according to the present invention, and plurality of terminals and a base station for relaying communication between the terminals comprises:

means provided in each of the terminals for transmitting a transmission right demand signal upon initiation of transmission and a transmission end signal upon termination of transmission; and the base station including means responsive to the transmission right demand signal from the terminal for assigning a transmission channel, and means responsive to the transmission end signal for releasing the channel assignment and for assigning the transmission channel for the terminal newly obtaining the transmission right.

In a half duplex communication system, only one of mutually communicating terminal equipments is allowed to perform transmissions, although the terminals are assigned a transmit frequency and a reception frequency, respectively. In a case where a terminal X in zone A is communicating with a terminal Y in zone B, four channels are assigned. The first is a forward channel from a base station in zone A to terminal X. The second is a backward channel from terminal X to the base station of zone A. The third is a forward channel from a base station of zone B to the terminal Y. The fourth is a backward channel from the terminal Y to the base station of the zone B. In actual operation of the conventional half duplex communication system, one of the two forward channels and one of the two backward channels are used simultaneously. Accordingly, by managing which terminal is allowed to transmit in the base station and assigning channel only for the terminal allowed to perform transmission, wasting of the channel by maintaining channel assignment for the terminal which is not in the transmitting state, can be avoided. For enabling this, in the half duplex communication system according to the present invention, an end signal notifying the end of transmission is transmitted from each terminal at the end of transmission. The base station is responsive to the transmission end signal to cancel the channel assignment for the corresponding terminal and assigns that channel to the terminal which is newly allowed to transmit. When the counterpart terminal is outside of the service zone in question, the channel is not required to be assigned to that counterpart terminal. Therefore, unnecessary assignment of the frequency can be successfully avoided.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of a half duplex radio communication system according to the present invention will be discussed herebelow with reference to the drawings.

Figure 1:
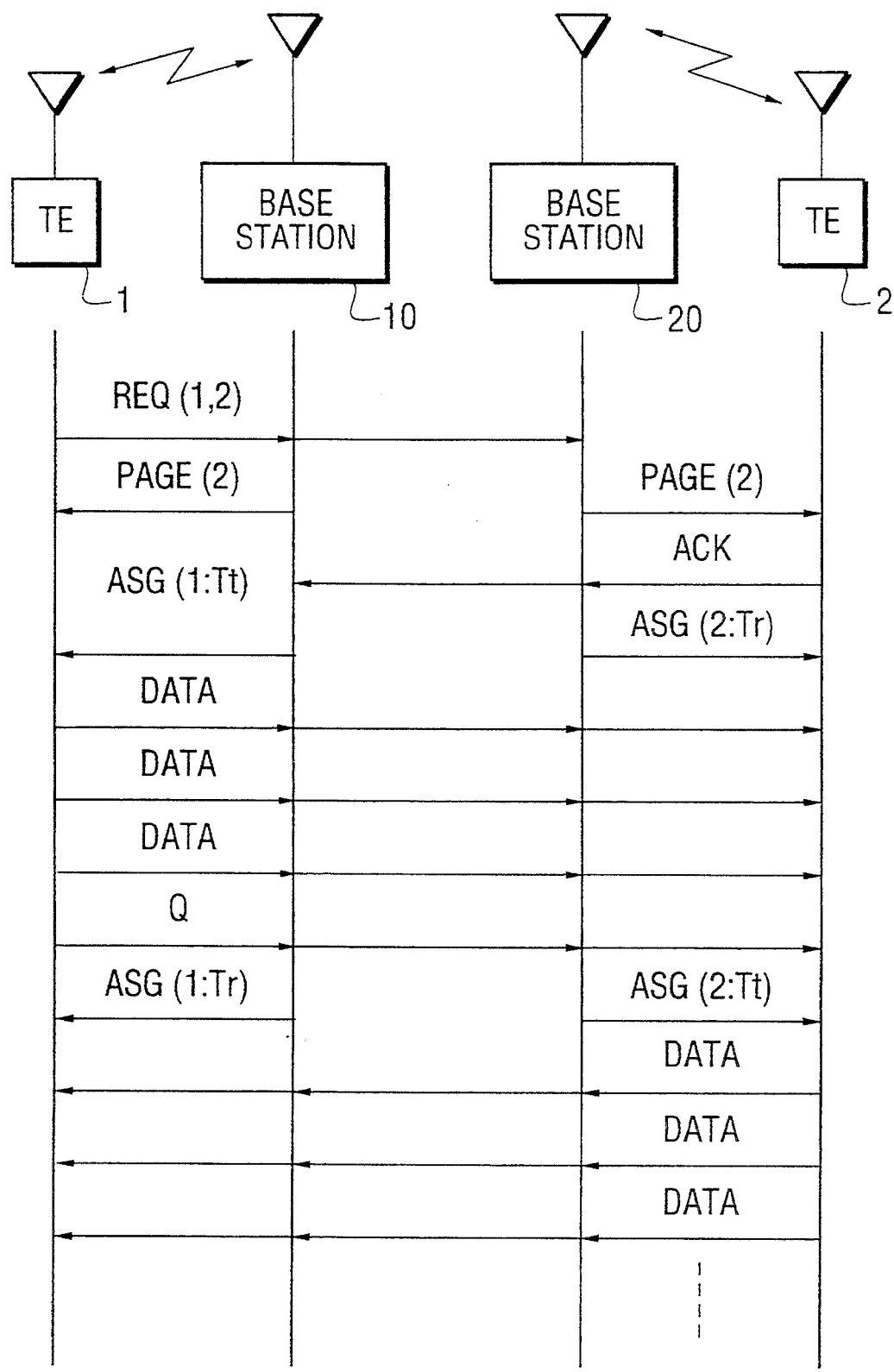
FIG. 1 is a fragmentary block diagram and chart illustrating the operation of channel assignment in the preferred embodiment of a half duplex radio communication system according to the present invention.

FIG. 1 is an illustration showing a system construction and an operation sequence for illustrating the preferred embodiment of the invention. The preferred embodiment of the half duplex radio communication system includes base stations 10 and 20. In each service zone of the base stations 10 and 20, a terminal 1, 2 is present. Discussion will be given herebelow with respect to communication between these two terminals 1 and 2.

At first, terminal 1 transmits a connection demand (transmission right demand) signal REQ(1, 2) for communication with the terminal 2, to the base station 10. The base station 10 transmit this signal to the other base station 20. Then, both of the base stations 10 and 20 call terminal 2 by paging signals PAGE(2). Since terminal 2 is present within the service zone of the base station 20, terminal 2 sends an acknowledge signal ACK to the base station 20. This signal ACK is transmitted to the base station 10 from the base station 20 to establish a connection route.

The base station 10 assigns a channel for transmission to terminal 1 and transmits an assignment signal ASG(1: $T_t$) to terminal 1. The signal ASG(1:$T_t$) represents assignment of a transmission channel $T_t$ for terminal 1. At the base station 20, a reception channel for terminal 2 is assigned and an assignment signal ASG(2: $T_r$) is transmitted to terminal 2. It should be noted that $T_r$ represents the assigned reception channel. Terminal 1 transmits a data signal DATA, such as a voice message or so forth, through the assigned channel. At the end of the transmitted data, terminal 1 transmits an end signal Q. Upon reception of the end signal Q, the base station 10 releases assignment of the transmission channel for terminal 1. Simultaneously, the base station 10 transfers the end signal Q to the base station 20. In conjunction therewith, the base station 10 makes a reception channel assignment with an assignment signal ASG(1: $T_r$) for terminal 1. In the base station 20, after transmitting the end signal Q, the transmission channel assignment is effected by the an assignment signal ASKS(2: $T_t$) for terminal 2. By this, the transmission right is reversed and transferred to terminal 2. Therefore, terminal 2 is enabled to perform transmission of the data signal DATA through the assigned transmission channel.

By repeating the foregoing procedure until the termination of the communication, the assignment of the transmission channel for terminals 1 and 2 is instantly released at every end of transmission. Therefore, the transmission channel is effected only for the terminal which actually uses the transmission channel for transmission.

Figures 2, 3:
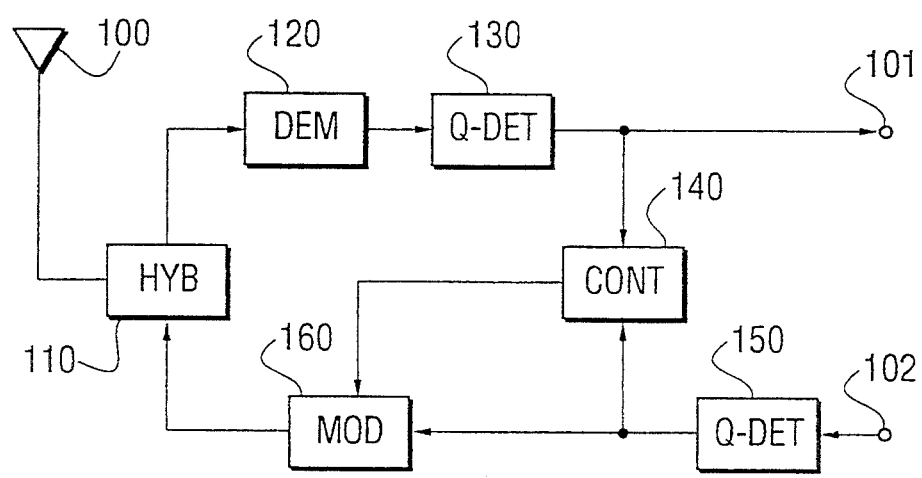
FIG. 2 is an illustration showing channel construction employed in the preferred embodiment of the invention.
FIG. 3 is a block diagram of a base station in the preferred embodiment of the invention.

FIG. 2 shows an example of the channel construction to be employed in the preferred embodiment of the communication system according to the invention and of an example of the transmission of the assignment signal for achieving high reliability of the assignment signal. The example shows a channel construction to be transmitted from the base station when the present invention is applied for three channel TDMA (Time Division Multiple Access). In FIG. 2, $f_1$ through $f_5$ represent frequencies and 1 through 3 represent time slots (three channels).

A broadcasting channel (BC) is a common signal, such as a paging signal. A control channel (CC) is a control signal for an initial connection. An assignment channel (AS) is unique in the present invention and is a signal designating a channel subsequent to the transmission end signal Q. Also, a traffic channel (T) is a channel for transmitting the data signal DATA, such as a voice message or so forth.

In the base station, when the transmission end signal Q is received through the traffic channel (T) from one of terminals in communication, the transmission channel assignment for the counterpart terminal is effected with the channel assignment signal AS($f_3$: 1). This AS($f_3$: 1) represents assignment of a slot 1 to the frequency $f_3$. In the example of FIG. 2, the assignment signal is transmitted twice through different assignment channels. The transmission of the assignment signal is effected through different frequencies of the channels. By this, even when failure is caused in one of the transmission paths for one of the assignment signals, the other assignment signal can be accurately received. Therefore, the probability of causing failure of assignment can be significantly lowered.

In FIG. 3, an example of the construction of the base station is illustrated. Although the base station is required to carry out various functions, only components required in the present invention are shown. The manner and functions for establishing communication are the same as for the conventional system and, thus, unnecessary to be discussed. Here, discussion will be given only for the operation for assigning channel during communication. In the following discussion of FIG. 3 the operation of the base station 10 of FIG. 1 will be discussed.

At first, discussion will be given for the case, in which a terminal 1 present in a communication area of the base station is transmitting over a channel $T_t$. A signal received through an antenna 100 is separated by a hybrid circuit 110 which separates transmitting signal and the received signal, and input the received signal into a demodulator 120. After demodulation of the received signal in the demodulator 120, the demodulated signal is input into a transmission end signal detector 130 which is adapted to modify channel assignments. In the transmission end signal detector 130, the transmission end signal Q is added to the data signal, such as the detected voice message signal, and whereby the termination of a series of transmissions in the traffic channel is detected. Irrespective of the presence or absence of the transmission end signal Q, a traffic signal is output to a terminal 101 as is.

At this time when the transmission end signal Q is detected in the transmission end signal detector 130, the received signal is transmitted to the base station 20 of the counterpart terminal 2 from the terminal 101. Simultaneously, the fact that the transmission end signal Q is received is notified to a control portion 140. The control portion 140 is responsive to this signal to know that the transmission traffic channel $T_t$, which has been busy, has become vacant and then register the corresponding traffic channel as the vacant channel for next assignment. Also, expecting arrival of the traffic signal from the base station 20, the base station 10 assigns the reception channel $T_r$ for terminal 1 through the assignment channel AS. The assignment signal is modulated by a modulator 160 and transmitted from the antenna 100 through the hybrid circuit 110.

Then the traffic signal from the base station 20 is received at a terminal 102, the received traffic signal is transmitted through the assigned reception traffic channel. When the signal is input to terminal 102, a transmission end signal detector 150 performs a search for detecting the transmission end signal Q in the same manner to that of the transmission end detector 130. When the transmission end signal Q is detected, this detection is reported to the control portion 140 from the transmission end signal detector 150. The control portion 140 is responsive to this signal to decide if the received signal has ended. Then, the received traffic channel used for receiving the traffic signal is registered as a vacant channel. Simultaneously, the transmission traffic channel is assigned to the terminal equipment 1. It is unnecessary of the transmission traffic channel assigned at this time to be the same as that assigned for the previous transmission, and can be of any vacant channel available at the instance of assignment.

Therefore, for the terminals, only one of the transmission and reception traffic channels is assigned to the terminal. Therefore, use efficiency of the frequency can be significantly improved.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A half duplex radio communication system including:
   a plurality of terminals, each of said plurality of terminals being equipped to communicate with each other; and
   a plurality of base stations, each of said plurality of terminals belonging to one of said base stations;
   wherein, each of said plurality of terminals includes means for sending a connection demand signal, upon initiation of a communication, to one of said of base stations to which said each terminal belongs and for sending a transmission end signal upon termination of a transmission; and
   each of said plurality of base stations includes:
      first channel assignment means responsive to said connection demand signal or said transmission end signal for automatically assigning a transmission channel to one of said plurality of terminals which sends said connection demand signal or is to receive said transmission end signal; and
      second channel assignment means responsive to said connection demand signal or said transmission end signal for automatically assigning a reception channel to one of said plurality of terminals which is to receive said connection demand signal or sends said transmission end signal.

2. A half duplex radio communication system as set forth in claim 1, wherein a channel assignment signal for assigning the transmission channel is transmitted at different times and at mutually different frequencies, upon receipt of a channel assignment.

3. A half duplex radio communication system as forth in claim 1, wherein a channel assignment signal indicative of said transmission channel or of said reception channel is transmitted by said channel assignment means at a plurality of times and at mutually different frequencies, upon a channel assignment to provide a redundant indication of said channel assignment.

* * * * *